United States Patent
Hillen

(10) Patent No.: US 10,948,923 B2
(45) Date of Patent: Mar. 16, 2021

(54) METHOD FOR OPERATING A SELF-TRAVELING ROBOT

(71) Applicant: Vorwerk & Co. Interholding GmbH, Wuppertal (DE)

(72) Inventor: Lorenz Hillen, Wuppertal (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 383 days.

(21) Appl. No.: 15/904,687

(22) Filed: Feb. 26, 2018

(65) Prior Publication Data

US 2018/0246524 A1 Aug. 30, 2018

(30) Foreign Application Priority Data

Feb. 27, 2017 (DE) .................. 10 2017 103 986.4

(51) Int. Cl.
*G05D 1/02* (2020.01)
*B25J 9/16* (2006.01)

(52) U.S. Cl.
CPC .......... *G05D 1/0274* (2013.01); *B25J 9/1664* (2013.01); *G05D 1/0272* (2013.01); *G05D 1/0285* (2013.01); *G05D 1/0297* (2013.01); *G05D 2201/0203* (2013.01); *G05D 2201/0215* (2013.01)

(58) Field of Classification Search
CPC .. G05D 1/0274; G05D 1/0272; G05D 1/0285; G05D 1/0297; G05D 2201/0203; G05D 2201/0215; B25J 9/1664
See application file for complete search history.

(56) References Cited

U.S. PATENT DOCUMENTS

| | | | |
|---|---|---|---|
| 6,374,155 B1* | 4/2002 | Wallach | G05D 1/0274 700/245 |
| 8,364,309 B1* | 1/2013 | Bailey | G05D 1/0272 700/245 |
| 8,380,349 B1* | 2/2013 | Hickman | G05D 1/0246 700/250 |
| 2016/0023351 A1* | 1/2016 | Kuffner | B25J 9/0084 700/248 |
| 2018/0071918 A1* | 3/2018 | Angle | G06Q 10/1095 |
| 2019/0324468 A1* | 10/2019 | Liss | G05D 1/0274 |

FOREIGN PATENT DOCUMENTS

DE 10 2008 014 912 A1 9/2009
DE 10 2011 000 536 A1 8/2012

* cited by examiner

*Primary Examiner* — Jeff A Burke
*Assistant Examiner* — Jamal A Shah
(74) *Attorney, Agent, or Firm* — Collard & Roe, P.C.

(57) ABSTRACT

A method for operating a self-traveling robot, wherein an environment map of an environment of the robot is generated based on measuring data recorded within the environment, wherein a position of the robot within the environment is estimated, and wherein the robot travels within the environment based on the environment map and its known position. In order to extend the maximum range of the robot within the environment, an environment map, which is currently not needed for the navigation of the robot, is detected and transmitted to an external memory unit.

20 Claims, 3 Drawing Sheets

METHOD FOR OPERATING A SELF-TRAVELING ROBOT

CROSS REFERENCE TO RELATED APPLICATIONS

Applicant claims priority under 35 U.S.C. § 119 of German Application No. 10 2017 103 986.4 filed Feb. 27, 2017, the disclosure of which is incorporated by reference.

TECHNICAL FIELD

The invention pertains to a method for operating a self-traveling robot, wherein an environment map of an environment of the robot is generated based on measuring data recorded within the environment, wherein a position of the robot within the environment is estimated, and wherein the robot travels within the environment based on the environment map and its known position.

The invention furthermore pertains to a computer program product for installation on a computer unit of a self-traveling robot.

PRIOR ART

Self-traveling robots and methods for their operation are known from the prior art. Calculations for generating an environment map are usually carried out by means of a dedicated computer unit of the robot and stored in a local memory of the robot.

Publications DE 10 2011 000 536 A1 and DE 10 2008 014 912 A1 describe such methods, e.g. in conjunction with self-traveling vacuum and/or floor cleaning robots. However, these methods can also be used for self-traveling transport robots, lawnmower robots or the like. The robots are preferably equipped with distance sensors that measure distances from obstacles. The measured distance data is used for generating an environment map, wherein this environment map makes it possible to plan a traveling route, along which a collision with obstacles is avoided. The distance sensors preferably operate in a contactless fashion, e.g. with the aid of light and/or ultrasound. It is furthermore known to provide the robot with all-around distance measuring means, e.g. in the form of an optical triangulation system, which is arranged on a platform or the like rotating about a vertical axis. The acquired distance data is processed into an environment map by means of an onboard computer of the robot and stored in a local memory of the robot such that this environment map can be accessed for orientation purposes in the working mode.

The storage of the environment map within the local memory of the robot has the disadvantage that only a limited number of environment maps or only an environment map of a certain size can be stored therein due to the limited storage capacity. The limited storage capacity therefore reduces the range of the robot within the environment because the robot only travels in sections of the environment, which are also recorded in the environment maps.

SUMMARY OF THE INVENTION

Based on the aforementioned prior art, the invention therefore aims to extend the range of the robot within the environment.

In order to attain the above-defined objective, the invention proposes that an environment map, which is currently not needed for the navigation of the robot, is detected and transmitted to an external memory unit. It is alternatively or additionally proposed that a map section of the environment map, which is currently not needed for the navigation of the robot, is detected, extracted from the environment map and transmitted to an external memory unit.

According to the invention, currently unused environment maps and/or map sections are identified as unused maps or map sections and transferred to an external memory unit. The environment maps or map sections, which are altogether available to the robot, are therefore partially stored in a local memory of the robot and partially stored in an external memory unit. In this way, the volume of map material, which is respectively stored in the robot and in the external memory unit, can be varied depending on the current navigation task of the robot. Based on accessing activities, a navigation and self-localization device of the robot detects the environment maps or map sections of an environment map, which are currently not needed for the navigation of the robot, particularly the navigation along a planned traveling route, such that they can be transferred to the external memory unit. It can furthermore be detected whether certain environment maps or map sections are needed or not needed based on the current position of the robot in the environment and therefore also in the environment map. The storage capacity of the external memory unit advantageously can be flexibly adapted such that, for example, less storage space of the external memory unit is occupied for small rooms than for large rooms, entire floors of a house or the like. The local memory of the robot, which usually is permanently installed in the robot, can be correspondingly reduced and replaced with an inexpensive external memory. In comparison with the prior art, the robot itself can be equipped with a relatively small memory, which for users with relatively small rooms is sufficient for storing the generated environment maps of the rooms. However, if the robot is used in large rooms, on multiple floors or even in multiple houses, a plurality of environment maps and/or at least one section of an environment map is advantageously transferred to the external memory unit, from where it/they can be once again retrieved by the robot on demand, e.g. when the robot enters a section of the environment that is related to a different environment map or a different map section stored in the external memory unit. The calculations for the navigation of the robot are carried out by means of a local computer unit of the robot, namely based on the map material currently stored in the robot. In contrast, all environment maps and map sections, which are currently not needed for the navigation calculations, are transferred to the external memory unit.

In order to carry out the navigation calculations, the robot is equipped with at least one processor, as well as a local memory that typically features a volatile memory, e.g. a random access memory. However, the local memory may, in principle, additionally feature a non-volatile memory, e.g. a flash memory. The robot furthermore features various sensors, drives, cleaning devices or the like. According to the invention, a currently needed environment map or a currently needed map section is preferably kept in the volatile memory of the robot, if applicable also in a non-volatile memory of the robot, e.g. for maintaining the persistence of the environment maps between different work cycles of the robot or for intermediate storage purposes. Conventional mapping and self-localization methods, e.g. known SLAM methods, are applied to the environment map stored in the robot or the map section stored in the robot. According to the invention, the size of the portion of the environment, which the robot can measure and map, is limited on the one hand by the spatial resolution of the environment map, e.g. the box size of a grid map, and on the other hand by the available storage space in the local memory of the robot, as well as in the external memory unit. For example, if the robot operates in an environment that is smaller than a maximum processable environment defined by the local memory, a section of the local memory remains unused. However, if the robot operates in a comparatively larger environment, not all map sections of the environment map or not all of multiple environment maps can be stored within the local memory of the robot, but rather are transmitted to the external memory unit. In addition to the volatile memory, the robot may in this case also feature a non-volatile memory that is relatively small in comparison with the external memory unit. Alternatively, the non-volatile memory may be completely transferred into the external memory unit such that the robot itself only features a volatile memory.

Self-traveling robots usually operate in environments that can be easily divided into sections. Such sections may consist, e.g., of individual rooms of a residence such as the kitchen, the dining room, bedrooms and the like. Furthermore, large continuous rooms that serve for different residential purposes can also be divided into sections, e.g. into a living area, a dining area, a kitchen area and the like. This means that only sections of rooms can also be mapped in a separate environment map. The transition points between these environment maps are also stored such that the spatial relations are known. It is alternatively also possible to generate a global environment map for the entire work environment.

It is proposed that an environment map, which is currently needed for the navigation, and/or a map section, which is currently needed for the navigation of the robot, is stored in a local memory of the robot. The local memory is preferably a volatile memory such as, e.g., a random access memory, in which the navigation calculations are also carried out. During the transit into another portion of the environment, which is related to a different map section or a different environment map, the active map section, which is currently stored in the local memory of the robot, is shifted from the local memory of the robot into the external memory unit and a new, currently needed map section or currently needed environment map is transferred into the local memory of the robot. For this purpose, the robot requests the required environment map or the required map section from the external memory unit. This can be realized by downloading the respective environment map or map section from the memory. A communication link for transmitting the environment maps or map sections between the memory of the robot and the memory of the external memory unit may contain a network interface such as, e.g., a WLAN module. The memory of the external memory unit is preferably realized in the form of a database.

It is proposed that the unneeded environment map and/or the unneeded map section is transmitted to an external local server and/or an Internet server and stored thereon. The external local server may consist, for example, of a dedicated server of the user of the robot. For example, this local server may be a PC, a laptop, a tablet computer, a mobile telephone or the like. This server is located, e.g., in the same home network as the robot itself. The robot can communicate with the server, e.g., by means of a WLAN module. Alternatively, the external memory unit may consist of an Internet server or at least a certain storage area of an Internet server. The Internet server preferably provides a so-called cloud. This type of cloud storage is preferably variable with respect to its storage capacity such that, for example, only the actually used storage capacity is subject to a fee. Consequently, the robot can be equipped with a small and therefore particularly inexpensive local memory, wherein the users can then decide on the storage capacity of the external memory unit themselves as needed. For example, the Internet server may preferably also consist of a server of the robot manufacturer.

Multiple robots preferably transmit environment maps and/or map sections to the external memory unit, wherein a first robot can access an environment map and/or a map section transmitted by a second robot. According to this embodiment, multiple robots access a common map database, wherein each robot or at least multiple robots transmit environment maps and/or map sections to the external memory unit and one or more other robots access these environment maps and/or map sections. The multiple robots preferably are robots that operate in parallel in a common environment and have access to stored environment maps and map sections of one or more other robots. The environment maps of the robots are combined in the external memory unit, wherein robots operating in large environments occupy a relatively large storage space, e.g., of the external memory unit and robots operating in small environments occupy a correspondingly smaller storage space. Upon exiting an environment section, each robot can store the associated environment map or the associated map section in the external memory unit and download a subsequently needed environment map or subsequently needed map section from the external memory unit. Since the storage capacity, e.g., on Internet servers is virtually unlimited, any number of robots can clean environments of any size without completely occupying the memory in practical applications. The principle of mutually making available environment maps or map sections also has the advantage that not each robot involved has to map its environment itself.

It is proposed that the robot receives upon a change of its position, which is related to a previously unneeded environment map and/or a previously unneeded map section of an environment map, this environment map and/or this map section from the external memory unit. As explained above, an exchange of environment maps and map sections therefore takes place in the local memory of the robot. In this way, the occupied storage space within the robot is not increased.

It is furthermore proposed that a newly generated environment map and/or a newly generated map section is stored within a local memory of the robot while it is generated. When the robot enters a previously unmapped environment section, the previously used environment map or the previously used map section is transmitted to the external memory unit and a new environment map or a new map section is established within the local memory of the robot.

In the case of a so-called "kidnapped robot" problem, in which the robot is positioned at an unknown location of the environment and respectively has to localize itself or determine that it was positioned in an unknown section of the environment, the robot successively loads each known map section or each known environment map into its local memory and attempts to orient itself therein. In this case, the environment map or map section, which corresponds best to the current measuring data, remains loaded in the local memory. This is realized, e.g., by means of a known scan-matching method. If the confidence in the self-localization in all map segments is very low, i.e. if only a poor correspondence exists between the measuring data of the robot and the environment maps or map sections, it must be assumed that the robot was positioned in an unknown section of an environment. In this case, a new environment map or a new map section is established.

It is furthermore proposed that environment maps and/or map sections stored in the robot and/or the external memory unit are illustrated on a display. According to this embodiment, for example, the robot may feature a display, on which the environment map or map section currently stored in its local memory is illustrated for the user. Furthermore, the environment maps or map sections, which are not stored in the robot itself, but rather in the external memory unit, can be selectively illustrated on said display. The user can preferably also select whether the memory content of the robot or the external memory unit should be illustrated, e.g. by means of a selector switch on a touchscreen. Furthermore, the robot can also be used in conjunction with an external device that features a display, e.g. a smart phone, a tablet computer, a laptop or the like. A communication link between the external device and the robot is established such that this external device can access the local memory of the robot and preferably also the memory of the external memory unit and display its content.

It is ultimately proposed that the robot receives an environment map and/or a map section, which contains at least part of a planned traveling route of the robot, from the external memory unit in advance. In this way, an environment map or map section, which will be needed in the near future, can be stored in the local memory of the robot in advance. This can serve, e.g., for safety purposes in case the communication link between the robot and the external memory unit is lost or for also ensuring the progress of the robot along the traveling route during the exchange of the environment map or the map section. The premature storage of an environment map or map section is particularly advantageous if an environment map used so far or a map section used so far and an adjacent environment map or an adjacent map section at least partially overlap. The advanced storage of a shortly needed environment map or a shortly needed map section can advantageously take place in a non-volatile memory of the robot, which in turn is accessed by the volatile memory of the robot.

It would furthermore be conceivable that not only storage capacity, but also computing capacity is transferred from the robot to an external unit, preferably to an Internet server. In this way, the robot can be provided with a computer unit that only has a low computing capacity. For example, the robot could feature a microcontroller.

In addition to the above-described method for operating a self-traveling robot, the invention furthermore proposes a computer program product for installation on a computer unit of a self-traveling robot, wherein the computer program product is designed for prompting the robot to carry out an above-described method. It is particularly proposed that the computer program product is designed for prompting the robot to detect and transmit an environment map and/or a map section of an environment map, which is currently not needed for the navigation of the robot, to an external memory unit. In addition, the computer program product can also initiate other steps of the method, e.g. the storage and request of needed environment maps or needed map sections in/from the external memory unit, the generation of a new environment map or the generation of a new map section within the local memory of the robot or the illustration of an environment map and/or a corresponding map section, which is stored in the robot and/or the external memory unit, on a display of the robot or an external device. Furthermore, all characteristics and advantages described above with reference to the method also apply accordingly to the computer program product.

BRIEF DESCRIPTION OF THE DRAWINGS

The invention is described in greater detail below with reference to exemplary embodiments. In the drawings.

DESCRIPTION OF THE EMBODIMENTS

Figure 1:
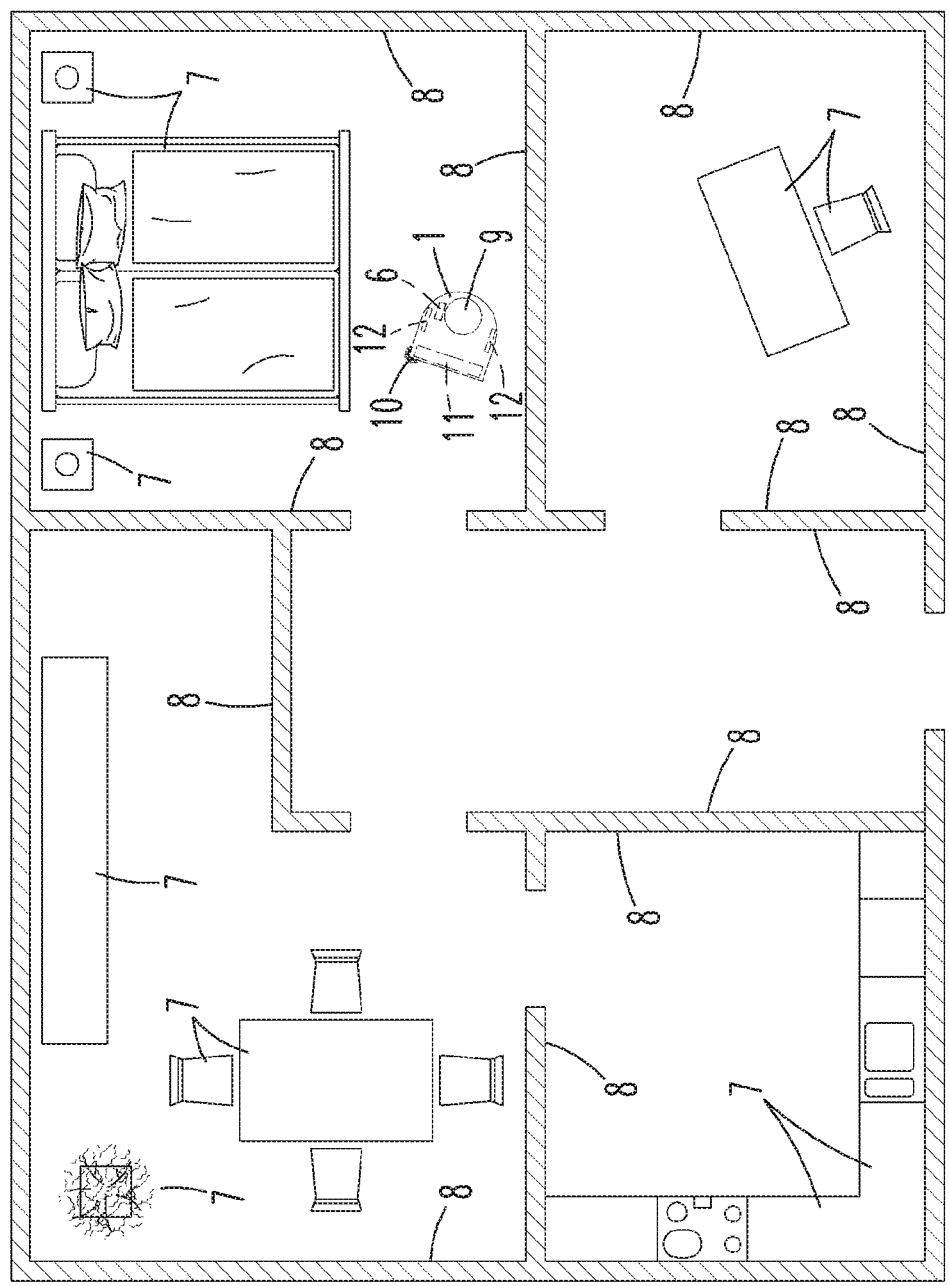
FIG. 1 shows a robot within an environment.

FIG. 1 shows an environment 2, in which a robot 1 moves. In this case, the environment 2 is a residence with multiple rooms that feature obstacles 7 and walls 8. The obstacles 7 consist, e.g., of pieces of furniture or other furnishings, in this case cabinets, tables, chairs, a kitchenette, flowers, a bed, nightstands, a desk and the like. The robot is illustrated in an enlarged fashion in FIGS. 2 and 3 and in this case realized, e.g., in the form of a vacuum robot. The robot features motor-driven wheels 12, by means of which it can travel within the environment 2. The robot 1 furthermore features cleaning elements 10, 11, namely a lateral brush (cleaning element 10) and a bristle roller (cleaning element 11) that serve for acting upon a surface to be cleaned. In the region of the cleaning element 11, the robot 1 contains a not-shown suction mouth opening, through which air containing material to be vacuumed up can be sucked into the robot 1 by means of the motor-blower unit. The robot 1 is equipped with a not-shown rechargeable battery for the electric power supply of the individual electrical components of the robot 1 such as the drive for the wheels 12 and the cleaning elements 10, 11, as well as additionally provided electronics. The robot 1 is furthermore equipped with a distance measuring device 9, which in this case features, e.g., a triangulation measuring device. The distance measuring device 9 measures distances from obstacles 7 and walls 8 within the environment 2 of the robot 1. The distance measuring device 9 specifically features a laser diode, the emitted light beam of which is guided out of a housing of the robot 1 by means of a deflection device and rotatable about a vertical axis of rotation in the orientation of the robot 1 shown, particularly with a measuring angle of 360 degrees. An all-around distance measurement about the robot 1 can thereby be achieved.

The distance measuring device 9 makes it possible to survey the environment 2 of the robot 1 in a preferably horizontal plane, i.e. in a plane extending parallel to the surface to be cleaned. In this way, the robot 1 can travel within the environment 2 while avoiding a collision with obstacles 7 and walls 8. The measuring data recorded by means of the distance measuring device 9, which represents distances from obstacles 7 and/or walls 8 in the environment 2, is used for generating an environment map of the environment 2. Furthermore, the robot 1 may feature, e.g., a not-shown odometry sensor that measures the distance traveled by the robot 1. It would furthermore also be conceivable, for example, to provide the robot 1 with contact sensors or the like.

The robot 1 furthermore features a local memory 6 that serves for storing an environment map or a map section 5 of an environment map. In this case, the local memory 6 is realized, e.g., in the form of a volatile memory, in which navigation and self-localization calculations of the robot 1 are also carried out.

Figure 2:
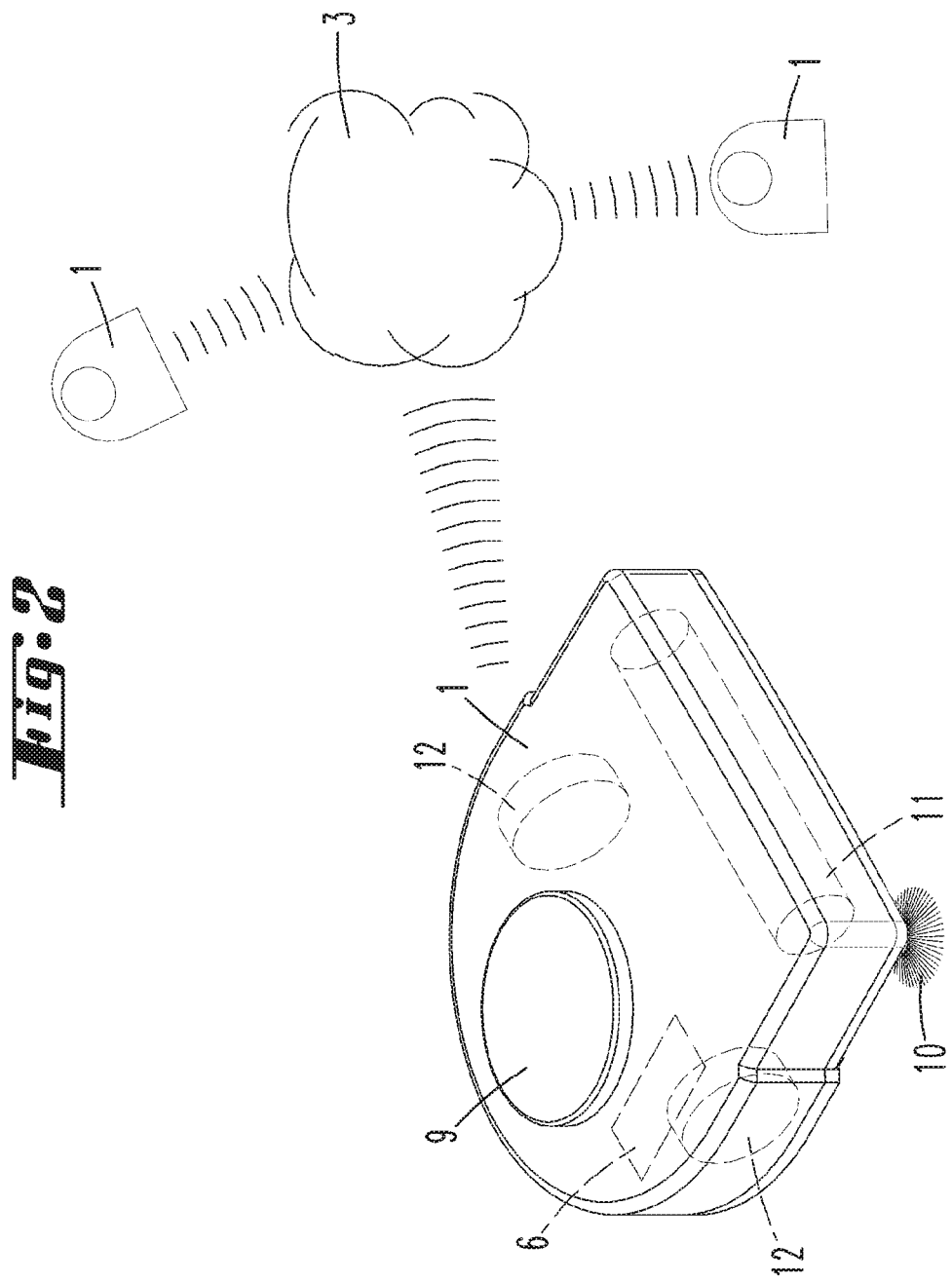
FIG. 2 shows a system consisting of an external memory unit and multiple robots communicating therewith.

According to FIG. 2, the robot 1 is communicatively linked to an external memory unit 3, which in this case consists, e.g., of a cloud storage. Additional robots 1 likewise are communicatively linked to this external memory unit 3.

Figure 3:
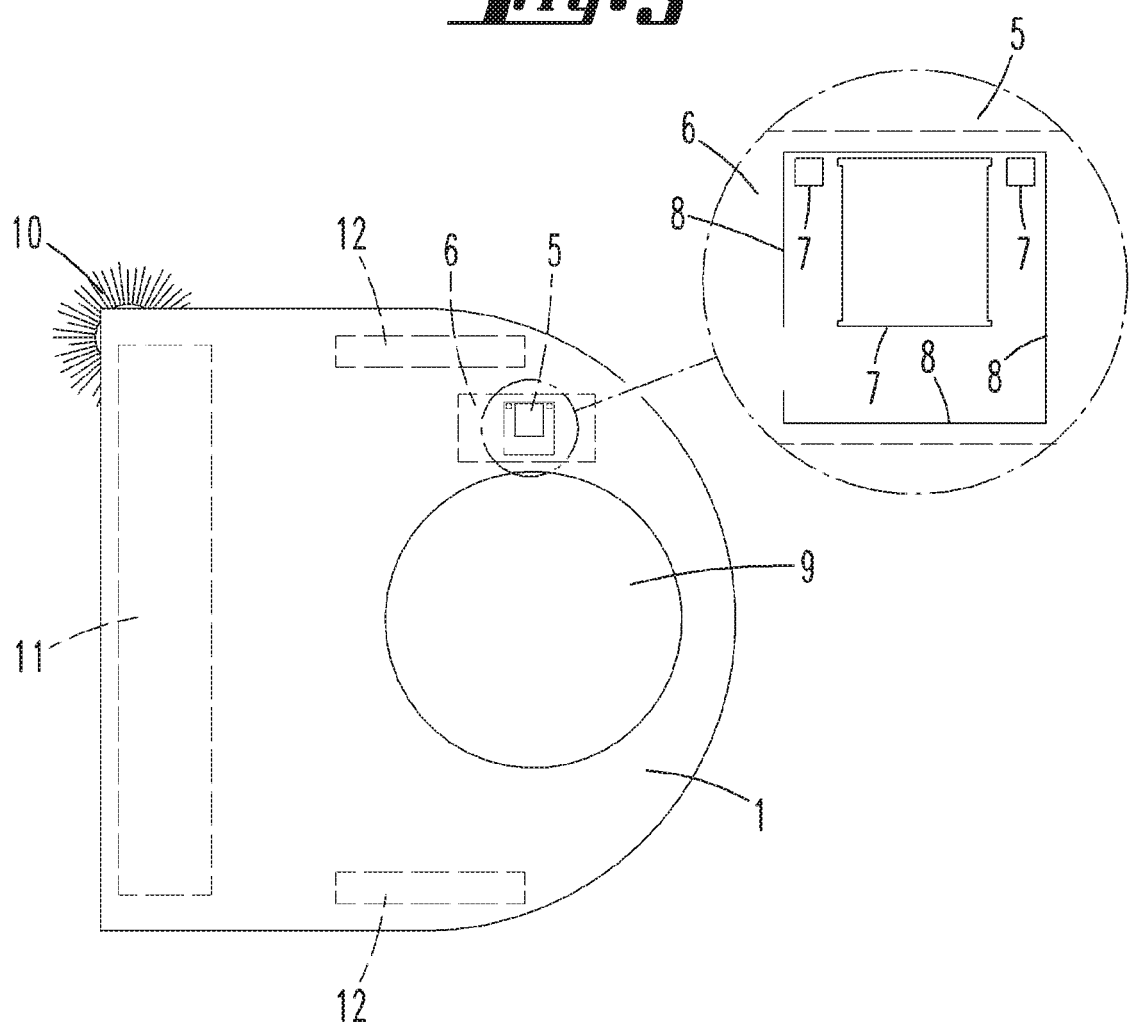
FIG. 3 shows a robot with a local memory and a map section stored therein.

FIG. 3 shows a more detailed illustration of the robot 1 with the map section 5 stored in the local memory 6.

Figure 4:
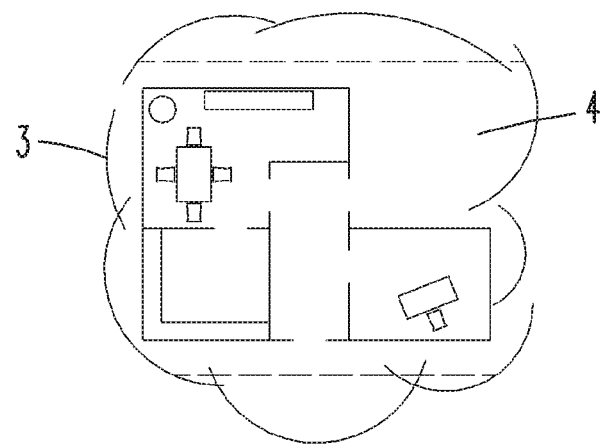
FIG. 4 shows an external memory unit with a map section stored therein.

FIG. 4 ultimately shows the external memory unit 3 with a map section 4 stored therein.

The invention functions in such a way, for example, that each of the robots illustrated in FIG. 2 travels within the environment 2 and in the process performs a cleaning task or another task. The tasks may generally consist of floor cleaning tasks or, e.g., a mere progressive motion in order to transport objects, implements or the like. Each robot 1 generates an environment map or a map section 4, 5 of its environment and stores this environment map or map section either in its local memory 6 or in the external memory unit 3. The method is described below with reference to the exemplary robot 1 illustrated in FIG. 3 only, wherein the other robots involved in the network (see FIG. 2) may operate accordingly.

As mentioned above, the robot 1 generates an environment map of the environment 2 and estimates its position within the environment 2 by comparing current measuring data with the position data of obstacles 7 and/or walls 8 stored in the environment map. During its progressive motion within the environment 2, the robot 1 preferably follows a planned traveling route. In the process, it constantly generates new environment maps or new map sections 4, 5 that are related, e.g., to individual rooms or room sections of the environment 2 illustrated in FIG. 1. For example, when the robot 1 exits a section of the environment 2, e.g. a room, and enters another section of the environment, i.e. another room, it transmits environment maps that are no longer needed or map sections 4 that are no longer needed to the external memory unit 3. Consequently, only the map section 5 that is related to the section of the environment 2, within which the robot 1 is currently located, is stored in the local memory 6 of the robot 1. According to FIG. 4, the map sections 4, which are currently no longer needed, are stored in the external memory unit 3, from which they can be downloaded by other robots 1 or at a later time also by the robot 1 itself. Only one map section 5, which contains the current position of the robot 1 and requires a relatively low storage capacity, is stored in the local memory 6 of the robot 1. If the position of the robot 1 changes in such a way that it is no longer contained in the map section 5 stored in the local memory 6, the robot 1 transmits the map section 5 to the external memory unit 3 and in return requests a new map section 4, 5, in which the traveling route of the robot 1 continues. For example, this new map section 4, 5 may be a map section 4, 5 that was stored in the external memory unit 3 by another robot 1. However, it may also be a map section 4, 5 that was stored in the external memory unit 3 by the robot 1 itself at an earlier time. During the progressive motion of the robot 1, the user of the robot 1 is provided with additional information on the environment map currently stored within the local memory 6 of the robot 1 or, additionally or alternatively, on environment maps or map sections 4, 5 stored within the external memory unit 3 by means of a display.

If the robot 1 travels in a previously unmapped section of the environment 2, it generates a new environment map or a new map section 5 within its local memory 6 by means of its navigation and self-localization device. Once this newly generated environment map or map section 5 is no longer needed by the robot 1, it is also transmitted to the external memory unit 3.

LIST OF REFERENCE SYMBOLS

1 Robot
2 Environment
3 External memory unit
4 Map section
5 Map section
6 Local memory
7 Obstacle
8 Wall
9 Distance measuring device
10 Cleaning element
11 Cleaning element
12 Wheel

What is claimed is:

1. A method for operating a self-traveling robot, comprising:
generating an environment map of an environment of the robot based on measuring data recorded within the environment,
estimating a position of the robot within the environment,
traveling with the robot within the environment based on the environment map and its known position,
identifying a currently unused environment map as an unused map, therefore detecting by a navigation and self-localization device of the robot an environment map, which is currently not needed for navigation of the robot, based on accessing activities to the unused environment map,
transmitting the environment map that is not currently needed for navigation of the robot from the robot to an external memory unit, and
retrieving the environment map that was transmitted to and is stored in the external memory unit by the robot on demand, when the robot enters a section of the environment that is related to an environment map stored in the external memory unit,
wherein during transit into another portion of the environment, which is related to a different environment map, a currently active environment map, which is currently stored in the local memory of the robot, is shifted from the local memory of the robot into the external memory unit and a new, currently needed environment map is transferred into the local memory of the robot.

2. The method according to claim 1, wherein an environment map, which is currently needed for the navigation of the robot, is stored in a local memory of the robot.

3. The method according to claim 1, wherein the external memory unit is an external local server and/or an Internet server.

4. The method according to claim 1, wherein multiple robots transmit environment maps to the external memory unit, and wherein a first robot can access an environment map transmitted by a second robot.

5. The method according to claim 1, further comprising the step of receiving by the robot, upon a change of its position, which position is related to a previously unneeded environment map or a previously unneeded map section of an environment map, a new environment map and/or new map section from the external memory unit.

6. The method according to claim 1, wherein a newly generated environment map or section thereof is stored within a local memory of the robot while the newly generated map or section is generated.

7. The method according to claim 1, further comprising the step of illustrating the environment map stored in the robot and/or the external memory unit on a display.

8. The method according to claim 1, further comprising the step of receiving by the robot an environment map and/or a map section, which contains at least part of a planned traveling route of the robot, from the external memory unit in advance of the robot traveling the planned traveling route.

9. A non-transitory computer-readable medium having a stored computer program for installation on a computer unit of a self-traveling robot, wherein the computer program is designed for prompting the robot to carry out the method of claim 1.

10. The method according to claim 1, wherein identifying the currently unused environment map is based additionally on a current position of the robot in the environment.

11. A method for operating a self-traveling robot, comprising:
generating an environment map of an environment of the robot based on measuring data recorded within the environment,
estimating a position of the robot within the environment,
traveling with the robot within the environment based on the environment map and its known position,
identifying a currently unused map section of the environment map as an unused map section, therefore detecting by a navigation and self-localization device of the robot a map section of the environment map, which is currently not needed for navigation of the robot, based on accessing activities to the map section of the environment map, and
extracting the unused map section from the environment map and transmitting the unused map section from the robot to an external memory unit, and
retrieving the unused map section that was transmitted to and is stored in the external memory unit by the robot on demand, when the robot enters a section of the environment that is related to a map section stored in the external memory unit, wherein during transit into another portion of the environment, which is related to a different map section, a currently active map section, which is currently stored in the local memory of the robot, is shifted from the local memory of the robot into the external memory unit and a new, currently needed map section is transferred into the local memory of the robot.

12. The method according to claim 11, wherein an environment map, which is currently needed for the navigation of the robot, is stored in a local memory of the robot.

13. The method according to claim 11, wherein the external memory unit is an external local server and/or an Internet server.

14. The method according to claim 11, wherein multiple robots transmit environment maps to the external memory unit, and wherein a first robot can access an environment map transmitted by a second robot.

15. The method according to claim 11, further comprising the step of receiving by the robot, upon a change of its position, which position is related to a previously unneeded environment map or a previously unneeded map section of an environment map, a new environment map and/or new map section from the external memory unit.

16. The method according to claim 11, wherein a newly generated environment map or section thereof is stored within a local memory of the robot while the newly generated map or section is generated.

17. The method according to claim 11, further comprising the step of illustrating the environment map stored in the robot and/or the external memory unit on a display.

18. The method according to claim 11, further comprising the step of receiving by the robot an environment map and/or a map section, which contains at least part of a planned traveling route of the robot, from the external memory unit in advance of the robot traveling the planned traveling route.

19. A non-transitory computer-readable medium having a stored computer program for installation on a computer unit of a self-traveling robot, wherein the computer program is designed for prompting the robot to carry out the method of claim 11.

20. The method according to claim 11, wherein identifying the currently unused map section of the environment map is based additionally on a current position of the robot in the environment.

* * * * *